US008032999B2

(12) United States Patent
Herd

(10) Patent No.: US 8,032,999 B2
(45) Date of Patent: Oct. 11, 2011

(54) METHOD FOR IMPROVING OPERATION OF CRANK ASSEMBLY

(76) Inventor: Brian H. Herd, Lucerne, IN (US)

( * ) Notice: Subject to any disclaimer, the term of this patent is extended or adjusted under 35 U.S.C. 154(b) by 804 days.

(21) Appl. No.: 12/148,688

(22) Filed: Apr. 22, 2008

(65) Prior Publication Data

US 2008/0276754 A1 Nov. 13, 2008

Related U.S. Application Data

(60) Provisional application No. 60/914,498, filed on Apr. 27, 2007.

(51) Int. Cl.
*B23P 6/00* (2006.01)
*B23P 11/00* (2006.01)
*B21D 39/00* (2006.01)

(52) U.S. Cl. ................. 29/402.03; 29/402.08; 29/426.1; 29/525; 29/525.01; 29/278; 74/545

(58) Field of Classification Search .................... 29/229, 29/525.01, 525.03, 453, 401.1, 402.03, 402.06, 29/402.08, 402.12, 402.14, 426.1, 525, 278; 74/545, 548, 550, 551.9
See application file for complete search history.

(56) References Cited

U.S. PATENT DOCUMENTS 4,220,054 A * 9/1980 Kuhlman ........................ 74/545
6,179,534 B1 * 1/2001 Weckter ........................ 410/103
2009/0078095 A1 * 3/2009 Hsieh .............................. 81/436

OTHER PUBLICATIONS

Morton Machine Works, 2006 Catalog.pp. 1-128 Source: http://www.mortonmachine.com/download/MortonCatalog.pdf.*

* cited by examiner

*Primary Examiner* — Jermie Cozart
(74) *Attorney, Agent, or Firm* — James Ray & Associates, LLC

(57) ABSTRACT

In combination with a crank assembly, the improvement comprising an apparatus for improving operation of the crank assembly. The apparatus includes an elongated extension member having each of a predetermined shape, a first predetermined length and formed of a first predetermined material, such predetermined shape includes a projection on one end thereof for engagement with one end of the crank assembly. A rotatable handle member is disposed around at least a portion of the elongated extension member, such rotatable handle member having a second predetermined length and formed of a second predetermined material. There is a means for securing the rotatable handle member to the elongated handle member.

6 Claims, 2 Drawing Sheets

METHOD FOR IMPROVING OPERATION OF CRANK ASSEMBLY

CROSS REFERENCE TO RELATED APPLICATIONS

This application is closely related to and claims benefit from U.S. Provisional Application Ser. No. 60/914,498 filed Apr. 27, 2007

FIELD OF THE INVENTION

The present invention relates, in general, to a crank, and, more particularly, the present invention relates to an improved crank design for lifting or lowering a trailer and can also be used for opening and closing hopper doors on bottom hopper trailers used for carrying grain.

BACKGROUND OF THE INVENTION

Existing crank design makes raising and lowering a trailer difficult to perform. With a metal collar and a metal handle that is crimped together as is frequently done, these cranks catch as they are rotated, making it hard to turn them properly since it is important that the handle portion spin freely. All of these deficiencies create a time consuming, labor-intensive process.

Thus it would be advantageous if there were a tool that would operate more efficiently that the presently used cranks.

SUMMARY OF THE INVENTION

In a first aspect the present invention provides in combination with a crank assembly, the improvement comprising an apparatus for improving operation of the crank assembly, the apparatus includes an elongated extension member having each of a predetermined shape, a first predetermined length and formed of a first predetermined material, such predetermined shape includes a projection on one end thereof for engagement with one end of the crank assembly. A rotatable handle member is disposed around at least a portion of the elongated extension member, such rotatable handle member having a second predetermined length and formed of a second predetermined material. There is a means for securing the rotatable handle member to the elongated handle member.

In a second aspect there is provided a method for improving operation of a crank assembly. The method comprises the steps of selecting the crank assembly. There is a step of removing the existing handle member on the crank assembly and a step of providing an elongated extension member having a projection disposed on one end thereof followed by a step of pressing said projection disposed on one end of said elongated extension member into one end of said crank assembly. This is followed by the step of sliding a rotatable handle section member of a predetermined plastic tubing over a portion of the elongated extension member and the step of securing the rotatable handle section member of the predetermined plastic tubing to the elongated extension member.

In a third aspect there is provided a method for improving operation of a crank assembly. The method comprises the steps of selecting said crank assembly and removing at least a portion of the existing handle member of the crank assembly. There is a step of providing an elongated extension member having a projection disposed on one end thereof and pressing the projection disposed on an end of the elongated extension member into the crank assembly. This is followed by sliding a handle section of a predetermined plastic tubing over a portion of the elongated extension member and then a step of securing the handle section of such predetermined plastic tubing to elongated extension member.

OBJECTS OF THE INVENTION

It is, therefore, one of the primary objects of the present invention to provide a crank handle for use with a crank for raising and lowering dollies on trailers that will make the rotational process smoother and easier.

Another object of the present invention is to provide a crank handle that will not rust onto the crank.

Still another object of the present invention is to provide a crank handle that will turn freely.

Yet another object of the present invention is to provide a crank handle that can either be retrofitted onto existing cranks or placed on new cranks.

Another object of the present invention is to provide a crank handle that can also be used with a crank to open and close doors on hopper bottom trailers used for hauling grain.

In addition to the various objects and advantages of the invention which have been described in some specific detail above it should be noted that various other objects and advantages of the present invention will become more readily apparent to those persons who are skilled in the relevant art from the following more detailed description, particularly when such description is taken in conjunction with the appended claims.

Figure 1:
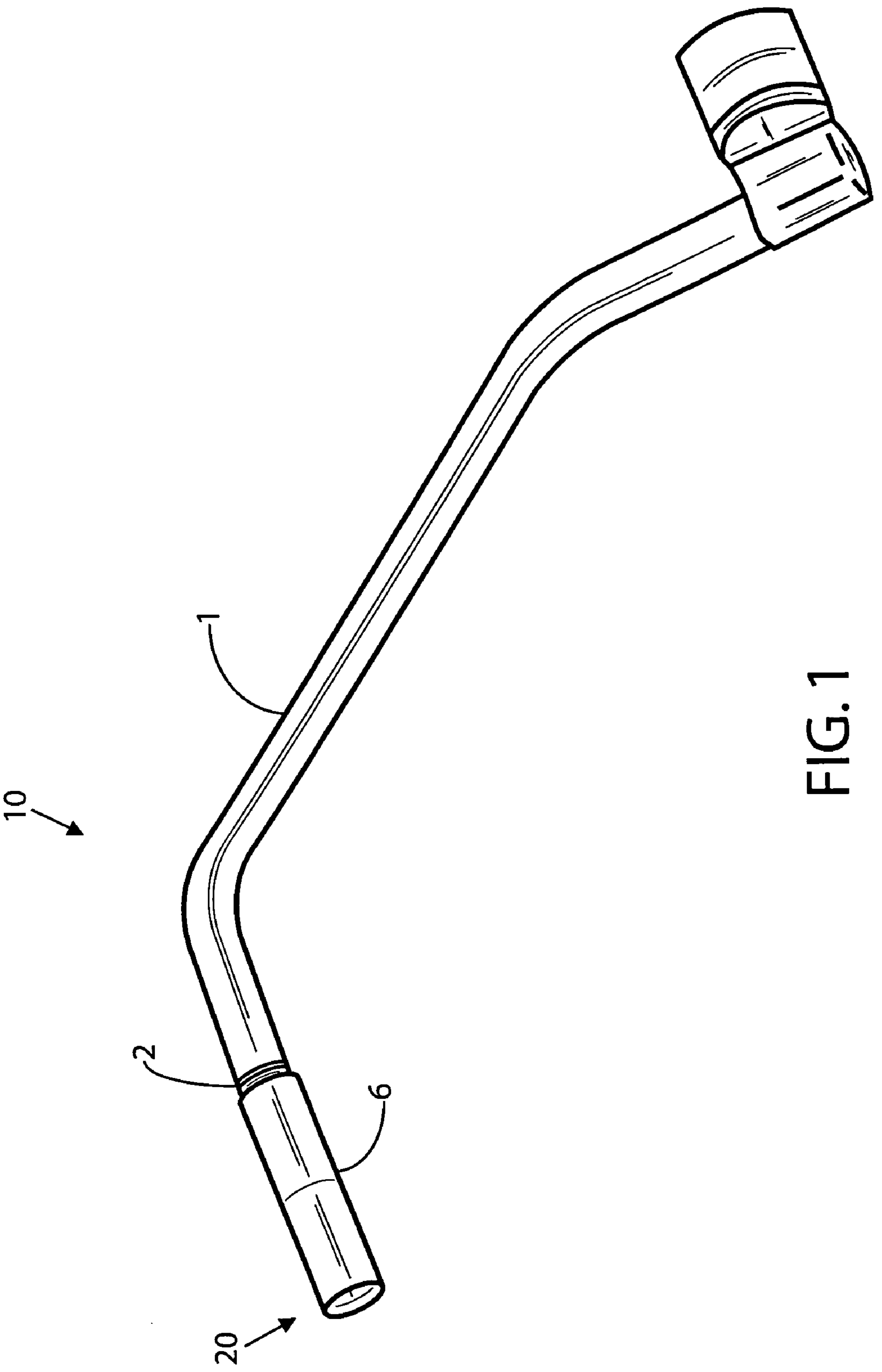
FIG. 1 is a perspective view of the crank assembly with the handle portion invention attached according to an embodiment of the invention.
Figure 2:
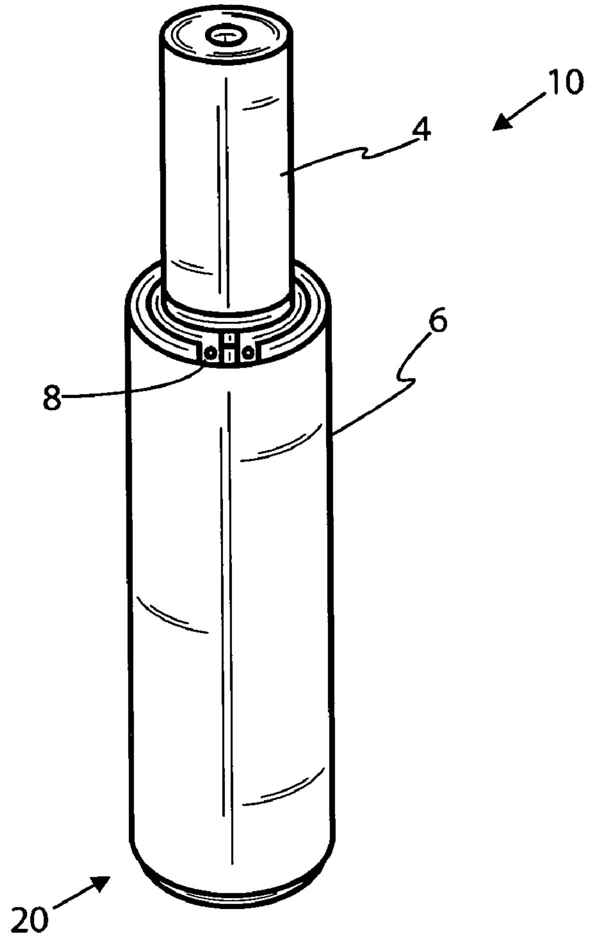
FIG. 2 is a is a top side perspective view of the present invention showing the securing means therein.
Figure 3:
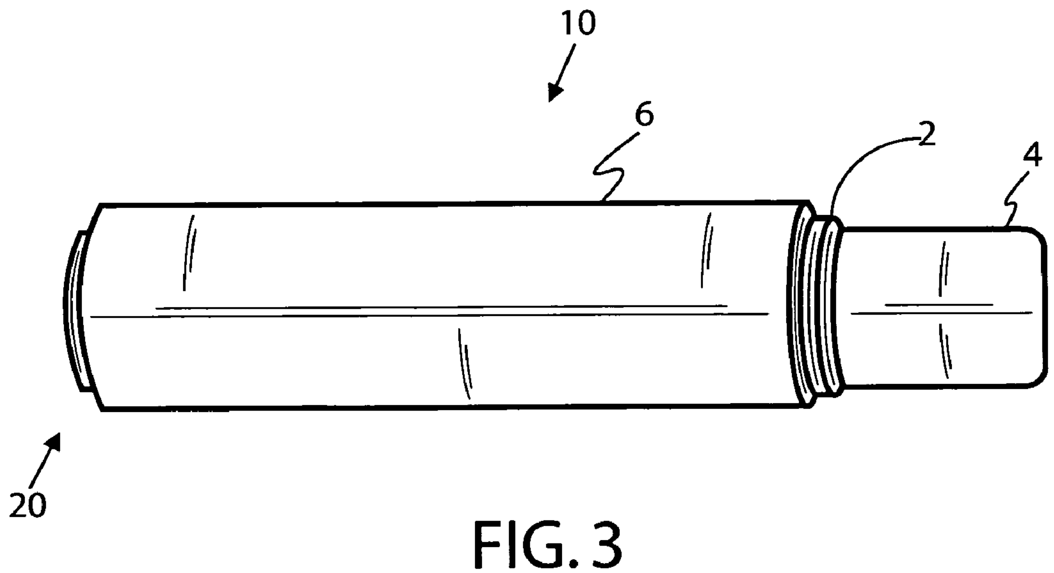
FIG. 3 is a side perspective view of the apparatus of the present invention.

BRIEF DESCRIPTION OF THE PRESENTLY PREFERRED AND VARIOUS ALTERNATIVE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

In a first aspect the present invention provides in combination with a crank assembly 1, the improvement comprising an apparatus, generally designated 10, for improving operation of the crank assembly. The apparatus 10 includes an elongated extension member 2 having each of a predetermined shape, a predetermined length and formed of a first predetermined material, the predetermined shape includes a projection 4 disposed on one end thereof for engagement with one end of the crank assembly. A rotatable handle member 6 is disposed around at least a portion of the elongated extension member 2, such rotatable handle member 6 being formed of a second predetermined material. There is, further, a means 20 for securing the rotatable handle member 6 to the elongated handle member 2.

It is preferred that such first predetermined material for forming the elongated extension member 2 is made of a material that does not rust and it is presently preferred that such material aluminum. It is also preferred that such aluminum is a solid piece of aluminum for forming the elongated extension member 2.

The predetermined length of the elongated extension member 2 is between about 5¾ inches and about 6¼ inches (approximately 6 inches in length).

The second predetermined material used to form the rotatable handle member 6 is preferably plastic and that such plastic is a wear-resistant plastic. It is further preferred that such plastic is Delrin. Delrin is a polyoxymethylene (POM) and is a brand name of DuPont. It is also presently preferred that such second predetermined length of the rotatable handle member is between about 4 inches and about 4½ inches.

The means 20 for securing the rotatable handle member 6 to the elongated extension member 2 includes at least one snap ring 8. It is presently preferred that such means 20 includes two snap rings 8, one snap ring 8 is disposed on each end of rotatable handle member 6.

In a second aspect there is provided a method for improving operation of a crank assembly 1. The method comprises the steps of selecting said crank assembly 1 and removing at least a portion of the existing handle member of the crank assembly 1. There is a step of providing an elongated extension member 2 having a projection 4 disposed on one end thereof and pressing the projection 4 disposed on an end of the elongated extension member 2 into the crank assembly 1. This is followed by sliding a handle section 6 of a predetermined plastic tubing over a portion of the elongated extension member 2 and then a step of securing the handle section 6 of such predetermined plastic tubing to the elongated extension member 2.

The method further includes the step of securing a snap ring 8 on each end of the predetermined plastic tubing 6 for holding such predetermined plastic tubing 6 in place.

The method also includes the step of using such crank assembly 1 for raising and lowering a dolly disposed on a trailer.

There is also a step of using the crank assembly for opening and closing doors on hopper bottom trailers used for hauling grain.

It is preferred that such predetermined plastic tubing used to form the rotating handle member is a polyoxymethylene.

The method in the step of removing at least a portion of the existing handle member includes a step of chop sawing so as to remove the existing handle member.

Thus, the present invention of a crank handle improves on existing crank design, making the rotational process smoother and easier. The handle is constructed of a non-rusting metal, preferably aluminum. The main shaft is between about 5¾ inches and about 6¼ inches long. (Approximately 6 inches). The shaft is covered with a rotatable handle member. It is presently preferred that such rotatable handle member is plastic and that such plastic is Delrin. Delrin is a polyoxymethylene (POM) and is a brand name of DuPont. Such plastic is a polymer with the chemical formula $—(O—CH_2)_n—$. It is a lightweight, low friction, and wear resistant thermoplastic.

The rotatable handle member of the present invention will not rust as occurs quite frequently with existing handles. With a metal collar and a metal handle on existing cranks, these cranks can catch as they are rotated, making it hard to turn them properly. When the handle and the crank are rusted they will not turn at all. The crank and the handle of existing units are made of steel wherein the handle portion can rust onto the crank and locks up and will not turn. Since the handle portion has to be able to turn freely this poses a problem with the existing crank systems.

Thus, the elongated extension member of the present invention is made of aluminum and the rotatable handle member is made of Delrin, neither of which will rust and, therefore, the handle spins freely. The handle and the crank are used to raise and lower dollies on trailers and also in opening and closing doors on hopper bottom trailers that haul grain. There also may be other applications for the crank.

In retrofitting an existing crank, one can simply chop saw off the old handle and press in the new EZ crank handle into the opening in the crank end. The handle can be fitted directly onto new cranks.

While a presently preferred embodiment and alternate embodiments of the present invention have been described in detail above, it should be understood that various other adaptations and/or modifications of the invention can be made by those persons who are particularly skilled in the art without departing from either the spirit of the invention or the scope of the appended claims.

I claim:

1. A method for improving operation of a crank assembly; said method comprising the steps of:

(a) selecting said crank assembly;

(b) removing at least a portion of an existing handle member of said crank assembly;

(c) providing an elongated extension member having a projection disposed on one end thereof;

(d) pressing said projection of said elongated extension member into said crank assembly;

(e) sliding a handle section of a predetermined plastic tubing over a portion of said elongated extension member;

(f) securing said handle section of said predetermined plastic tubing to said elongated extension member.

2. The method, according to claim 1, wherein said method further includes the step of securing a snap ring on each end of said predetermined plastic tubing for holding said predetermined plastic tubing in place.

3. The method, according to claim 1, wherein said method further includes the step of using said crank assembly for raising and lowering a dolly disposed on a trailer.

4. The method, according to claim 1, wherein said method further includes the step of using said crank assembly for opening and closing doors on hopper bottom trailers used for hauling grain.

5. The method, according to claim 1, wherein said predetermined plastic tubing is polyoxymethylene.

6. The method, according to claim 1, wherein said step of removing at least a portion of said existing handle member includes a step of chop sawing said existing handle member.

* * * * *